(No Model.) 2 Sheets—Sheet 2.
J. LITTLEJOHN.
MILK AERATOR.
No. 584,227. Patented June 8, 1897.
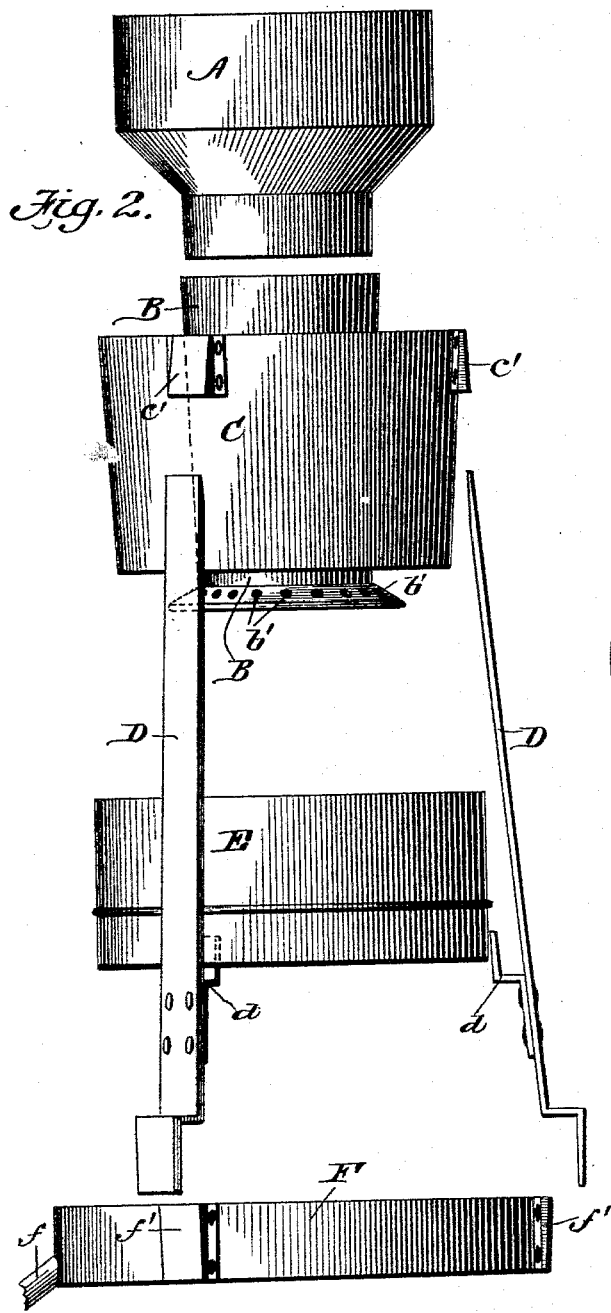
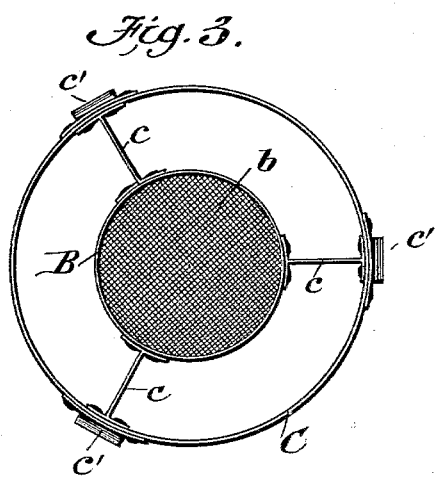
WITNESSES:
M. O. Bloudel
Edw. W. Byrn.
INVENTOR
John Littlejohn.
BY Munn & Co.
ATTORNEYS.
THE NORRIS PETERS CO., PHOTO-LITHO., WASHINGTON, D. C.

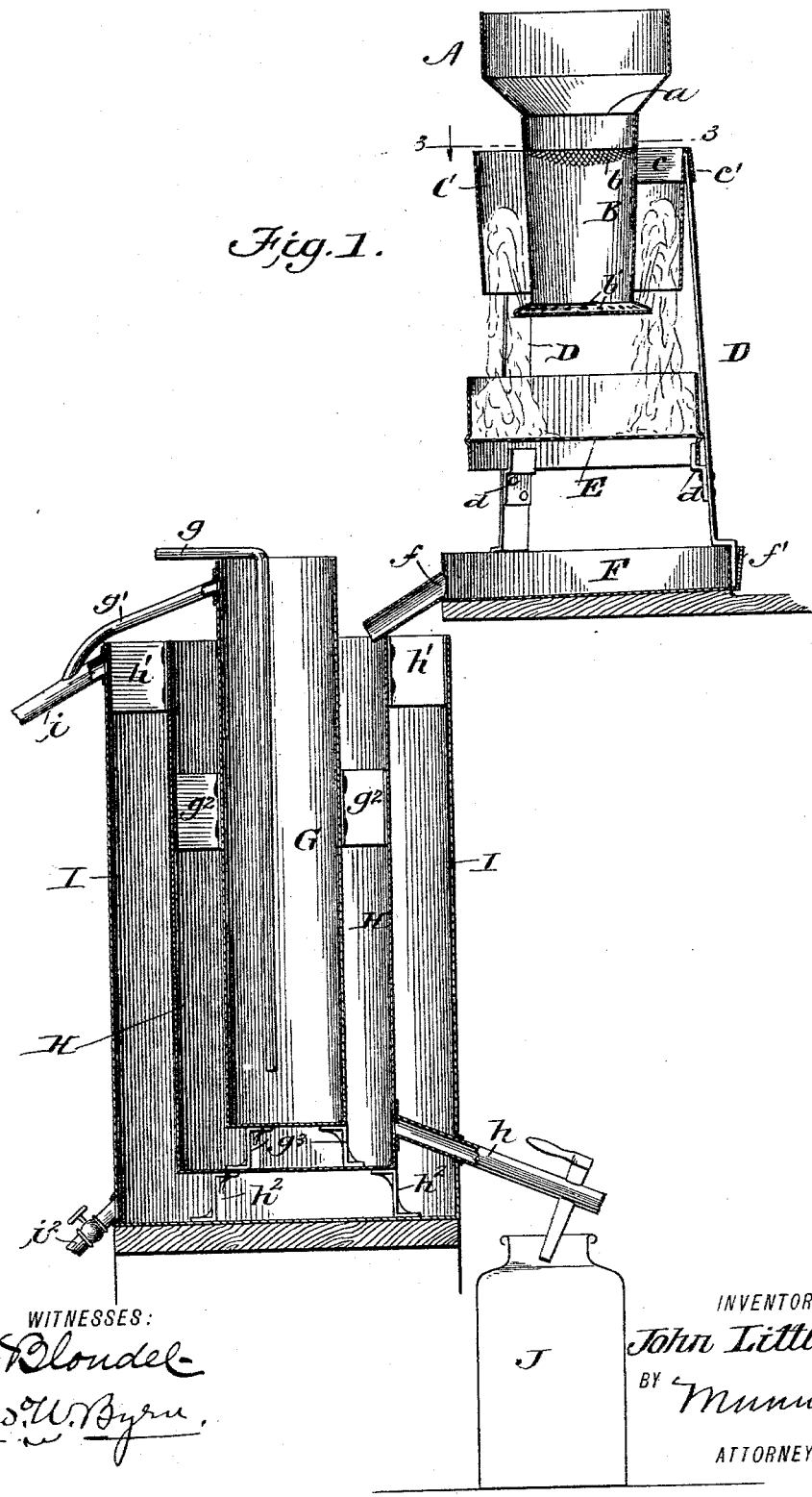

//<br>
UNITED STATES PATENT OFFICE.

JOHN LITTLEJOHN, OF AURORA, ILLINOIS.

MILK-AERATOR.

SPECIFICATION forming part of Letters Patent No. 584,227, dated June 8, 1897.

Application filed October 1, 1896. Serial No. 607,537. (No model.)

*To all whom it may concern:*

Be it known that I, JOHN LITTLEJOHN, of Aurora, in the county of Kane and State of Illinois, have invented a new and useful Improvement in Milk-Aerators, of which the following is a specification.

The object of my invention is to provide a milk aerator and cooler for eliminating from fresh milk the animal gases, odors, and heat, whereby the milk is rendered more pure and palatable and is enabled to keep sweet for a longer time without becoming rancid or sour.

To this end it consists in the peculiar construction and arrangement of a straining and spraying device for accomplishing the above results in one operation as the milk is transferred to the cans in which it is to be shipped or stored.

Figure 1 is a vertical section of the entire apparatus. Fig. 2 is a side view showing the parts of the aerator detached, and Fig. 3 is a horizontal section on line 3 3 of Fig. 1.

In the drawings, A represents the funnel-shaped top of the aerator. This has a fine strainer $a$ in it, and its lower end slides detachably and telescopically into the upper end of a cylindrical receiver B, whose bottom is closed and is flanged outwardly and the upper side of which hollow flange is perforated with a row of holes $b'$. An inside strainer $b$ is also arranged within the receiver B; but this may be dispensed with, if desired.

C is an outside shell or sleeve surrounding the receiver B. This shell is tapering and smallest at its lower end and is intended to receive against its inner walls the jets or sprays of milk as they rise through the row of holes $b'$ and conduct the milk down into the perforated pan E below. The purpose of the hollow flange at the bottom of the receiver B and the upwardly-opening holes is to cause the milk to rise in jets or sprays through the air for a long distance and then be received and spread out in a thin film against the inner wall of sleeve C, then fall into subjacent pan E, where it is further divided into drops by falling through the perforations into the bottom pan F. The bottom of this pan F is also inclined toward its outlet $f$, so that no milk stands in it; but the drops falling upon the hard bottom of said pan are further spattered into spray, thus securing a very complete aeration of the milk.

The sleeve C of the aerator is made with radial arms $c$ to hold the receiver B central therein and has also on the outside sockets $c'$, that detachably receive the upper ends of the standards D, while corresponding sockets $f'$ are formed on the sides of the base-pan F to detachably receive the lower offset ends of the standards, which offset causes any milk that may spatter on the standards to drain down into the pan F. The perforated pan E is also detachably supported upon lugs $d$, formed on the inner sides of the standards D, and serves to lock said standards together. It will thus be seen that the parts A, C, D, E, and F are all detachably connected, so as to permit these parts to be compactly packed for shipment or transportation, and yet are easily and quickly set up when desired for use.

As the milk passes out of the outlet $f$ of pan F it passes into the cooler. This consists of an inner cylindrical vessel G for ice or cold water, an outer vessel I for ice or cold water, and an intermediate vessel H, between which vessel H and the inner one G the milk is received from the outlet $f$ of the aerator. The vessel G is concentrically held in the vessel H by radial arms $g^2$ and legs $g^3$, and with them is removable to permit the cleaning of the milk-chamber, and the vessel H is similarly held in the outer one I by radial arms $h'$ and legs $h^2$. A flow of cold water is introduced into the inner chamber G through inlet-pipe $g$, leading to the bottom thereof, and the overflow is taken off through pipe $g'$ at the top, and a flow of water enters the outer chamber I through a pipe $i^2$ at its bottom, and its overflow passes off through pipe $i$ at the top, the two pipes $g'$ and $i$ emptying into the same discharge-pipe.

The milk issuing from the outlet $f$ of the aerator passes into the annular space between the vessels H and I, and after being cooled passes out through pipe $h$ at the bottom into the can J for shipment or storage. As the milk passes into the cooler it spreads itself in a thin film around the exterior of the taller vessel G, which facilitates the cooling, and as it passes down the space between G and H it is cooled on both sides as well as at the bottom, thus making a very effective means for quickly lowering the temperature while it is passing through on its way into the can.

With reference to the aerator it will be seen that there is no obstruction in the center of the same, and this allows perfect aeration from all sides directly through the aerator.

Having thus described my invention, what I claim as new, and desire to secure by Letters Patent, is—

1. A milk-aerator comprising a receiving-chamber B having at its lower end a flat bottom extended outwardly beyond the sides in the form of a hollow flange, or outwardly-projecting portion, with holes in the upper side of said hollow projecting portion to throw the milk up into the air in a spray, and an inclosing shell or guard entirely open at its lower end and surrounding the chamber B without touching it, for preventing the scattering of the spray and a subjacent receptacle substantially as and for the purpose described.

2. A milk-aerator comprising a funnel-shaped strainer, a receiver B joining onto the same and provided at its lower end with a hollow flat bottom extended outwardly beyond the sides in the form of a hollow flange, or outwardly-projecting portion, with holes in the upper side of said hollow projecting portion, a concentrically-arranged shell C having its lower end open and surrounding without touching the chamber B, standards supporting the shell and a subjacent receptacle for the milk substantially as and for the purpose described.

3. The combination of the strainer A, receiver B with upwardly-opening holes near its bottom, the surrounding sleeve C with sockets $c'$, standards D with lugs $d$, perforated pan E on said lugs, the base-pan F with sockets $f'$ for the standards, said parts being made detachable for compact storage substantially as and for the purpose described.

JOHN LITTLEJOHN.

Witnesses:
 I. B. CHATTLE,
 H. L. KRAHL.